(12) United States Patent
Ikegami

(10) Patent No.: US 7,793,616 B2
(45) Date of Patent: Sep. 14, 2010

(54) ANIMAL LITTER FOR ANIMALS

(75) Inventor: Takeshi Ikegami, Shinagawa-ku (JP)

(73) Assignee: Uni-Charm Petcare Corporation, Tokyo (JP)

( * ) Notice: Subject to any disclaimer, the term of this patent is extended or adjusted under 35 U.S.C. 154(b) by 0 days.

(21) Appl. No.: 12/324,594

(22) Filed: Nov. 26, 2008

(65) Prior Publication Data

US 2009/0082200 A1    Mar. 26, 2009

Related U.S. Application Data

(63) Continuation of application No. 11/167,947, filed on Jun. 28, 2005, now abandoned.

(30) Foreign Application Priority Data

Jun. 29, 2004   (JP)   ............................. 2004-192336
Nov. 12, 2004   (JP)   ............................. 2004-329077

(51) Int. Cl.
    *A01K 29/00*     (2006.01)
(52) U.S. Cl. ....................... 119/173; 119/171
(58) Field of Classification Search ................ 119/173, 119/171, 172
See application file for complete search history.

(56) References Cited

U.S. PATENT DOCUMENTS

| 4,641,605 A | 2/1987 | Gordon |
| 4,736,706 A | 4/1988 | Lang |
| 5,216,980 A | 6/1993 | Kiebke |
| 5,836,262 A | 11/1998 | Yasukawa |
| 6,287,550 B1 | 9/2001 | Trinh et al. |
| 2003/0209203 A1 | 11/2003 | Opfel |

FOREIGN PATENT DOCUMENTS

| EP | 0 204 152 | 12/1986 |
| JP | 63-501686 | 7/1988 |
| JP | 06-276875 | 10/1994 |
| JP | 6-343362 | 12/1994 |
| JP | 07-327536 | 12/1995 |
| JP | 09-023776 | 1/1997 |
| JP | 11-113435 | 4/1999 |
| JP | 2002-034372 | 2/2002 |
| JP | 2004-33047 | 2/2004 |
| JP | 2004-73053 | 3/2004 |

(Continued)

OTHER PUBLICATIONS

European Search Report dated Oct. 1, 2007, directed to European Patent Application No. 05254044.00; 3 pages.

(Continued)

*Primary Examiner*—Michael R Mansen
*Assistant Examiner*—Monica L Williams
(74) *Attorney, Agent, or Firm*—Morrison & Foerster LLP

(57) ABSTRACT

Animal litter for animals which consist of a plurality of granular materials, wherein the granular materials contain aromatic granular materials each of which has base material which generates heat by absorbing water and an aromatic component adsorbed onto the base material. According to the present invention, the animal litter for animals, which are not emitting a strong scent regularly, but emit a strong scent by absorbing an animal's excrement, and thereby effectively restrain the stench emitted from the excrement, can be provided.

8 Claims, 1 Drawing Sheet

FOREIGN PATENT DOCUMENTS

JP        2004-305141        11/2004

OTHER PUBLICATIONS

Takeshi Ikegami, U.S. Office Action mailed May 1, 2007, directed to U.S. Appl. No. 11/167,947; 7 pages.
Takeshi Ikegami, U.S. Office Action mailed Sep. 18, 2007, directed to U.S. Appl. No. 11/167,947; 7 pages.
Takeshi Ikegami, U.S. Office Action mailed Feb. 14, 2008, directed to U.S. Appl. No. 11/167,947; 7 pages.
Takeshi Ikegami, U.S. Office Action mailed Aug. 26, 2008, directed to U.S. Appl. No. 11/167,947; 8 pages.
Notification of Reasons for Rejection mailed on Mar. 30, 2010 directed at related application No. 2004-329077; 3 pages.

ANIMAL LITTER FOR ANIMALS

CROSS-REFERENCE TO RELATED APPLICATIONS

This application is a continuation of U.S. Ser. No. 11/167,947 filed Jun. 28, 2005, which is based upon and claims the benefit of priority from Japanese Patent application No. 2004-192336, filed on Jun. 29, 2004, and Japanese Patent application No. 2004-329077, filed on Nov. 12, 2004, the entire contents of which are incorporated herein by reference.

FIELD OF THE INVENTION

The present invention relates to animal litter for animals which consist of a plurality of granular materials, and more in particular, it relates to animal litter for animals which can effectively restrain stench emitted from excrements of animals.

RELATED ART

As a toilet for a dog, cat, or other animals that is kept indoors, box-like container made from plastics, having a plurality of granular materials called "animal litter for animals" or "cat sands" laid therein, is used. In general, animal litter for animals (may be referred to hereinafter simply as "animal litter") rapidly absorbs and holds urine, etc., excreted by animals, and in usage, a master of an animal removes and discards portions that have absorbed its excrements, and replenishes new animal litter. The use of animal litter for animals thus constantly accompanies unpleasantness due to stench emitted from animal excrements. In particular, the unpleasantness that is felt by an animal master, in the process of discarding animal litter stained with excrements, is inestimable.

To avoid this animal masters' unpleasantness due to stench, animal litter for animals, having fragrance or other aromatic component mixed therein, has been used. For example, an invention concerning a process of producing material for handling excrements, wherein an aromatic component is adsorbed and held by zeolite, bentonite, or other porous material, has been disclosed in Patent literature 1. With the present invention, to make the porous material adsorb and hold the aromatic component, the porous material is filled in a container containing the aromatic component. The present invention can provide animal litter having the effect of restraining the stench emitted from excrements of animals.

However, with the animal litter disclosed in Patent literature 1, the porous material must adsorb and hold a large amount of the aromatic component in order to effectively mask the stench emitted from excrements of animals. A strong scent coming from the aromatic component is thus emitted regularly, and in some cases, this made animal masters unpleasantness. While, if the adsorption amount of the aromatic component with respect to the porous material is decreased so as that a strong scent coming from the aromatic component will not be emitted, the stench from the excrements of animals cannot be restrained adequately.

[Patent literature 1] Japanese Patent Application laid-open No. 2002-34372

SUMMARY OF THE INVENTION

The present invention has been achieved in view of the problems described above and intends to provide animal litter that cannot emit a strong scent regularly, but emits a strong scent by absorbing water contained in excrement of animal, and thereby effectively restrains stench emitted from the excrement.

The present inventors carried out diligent research towards resolving the problems described above. As a result, the present inventors found that the problems described above can be resolved by using aromatic granular materials as animal litter for animals, wherein each of which has base material which generates heat by absorbing water and a small amount of an aromatic component adsorbed to the base material, and have thereby come to complete the present invention. More specifically, the present invention provides the following.

(1) Animal litter for animals which consist of a plurality of granular materials, wherein the granular materials contain aromatic granular materials each of which has base material which generates heat by absorbing water and an aromatic component adsorbed onto the base material.

The granular materials that compose the animal litter for animals of (1) include aromatic granular materials, each of which has base material which generates heat by absorbing water and an aromatic component adsorbed onto the base material. Thus, when water contained in excrement excreted by an animal is absorbed by the aromatic granular materials, the aromatic granular materials generate heat on their own and promote the volatilization of the aromatic component. Therefore, since a large amount of the aromatic component volatilizes into the atmosphere and the surroundings become filled with the strong scent of the aromatic component, the stench due to the excrement can be restrained effectively. Also, since the volatilization of the aromatic component can be promoted and the strong scent emits efficiently, the amount of aromatic component to be adsorbed onto the base material can be decreased. Thus the strong scent of the aromatic component will not be emitted regularly and will not fill a room, so that make an animal master feel unpleasant. The aromatic component used in the present invention may be a natural fragrance or a synthetic fragrance or a combination of such fragrances.

(2) The animal litter for animals according to (1), wherein a proportion of the aromatic granular materials, with respect to entirety of the granular materials, is no less than 10% by mass.

A proportion of the aromatic granular materials of the animal litter for animals of (2), with respect to the entirety of the granular materials, is no less than 10 weight %. In case that the proportion of the aromatic granular materials is less then 10 weight %, a bentonite smell is emitted strongly when water is absorbed, and therefore the effect of the stench restraining by the aromatic component is not exhibited adequately. More preferably, the proportion is no less than 33 weight %.

(3) The animal litter for animals according to (1) or (2), wherein the aromatic granular material has the aromatic component adsorbed near the surface of the base material.

The aromatic component of the aromatic granular materials used in the animal litter for animals of (3), is adsorbed near the surface of the base material. When these aromatic granular materials absorb water, the aromatic component volatilizes rapidly and thus stench emitted from animal excrements can be restrained effectively. When the aromatic component disperses throughout the entirety of the granular material, for example in the case that the granulation is performed by kneading the aromatic component into the base material, the aromatic component cannot volatilize easily on absorbing water, and so a large amount of the aromatic component must be needed. On the other hand, with the animal litter for animals of (3), since aromatic granular material has the aromatic component adsorbed near the surface of the base material, the stench can be restrained effectively with a small amount of the aromatic component. As a method of making the aromatic granular material which adsorbs aromatic component near the surface, the method of spraying the aromatic component onto the base material, etc., can be cited.

(4) The animal litter for animals according to any one of (1) to (3), wherein the aromatic granular material is obtained by adsorbing the aromatic component onto the base material in a room temperature state.

With the aromatic granular materials in the present invention, the aromatic component is adsorbed onto the base material in the room temperature state. In general, at 50° C. or higher, an aromatic component volatilizes, becomes oxidized and modified, and thus changes in scent. Therefore, by adsorbing the aromatic component onto the base material under room temperature, modification of the aromatic component can be avoided and the scent can be emitted in a stable manner. For example, when the base material of a bentonite or acid clay is treated by an alkali metal under a high temperature of 100° C. or higher, the aromatic component is preferably adsorbed after the temperature of the base material falls to about the room temperature.

(5) The animal litter for animals according to any one of (1) to (4), wherein an adsorption amount of the aromatic component is no less than 0.005% and no more than 1% with respect to the mass of the base material.

In the animal litter for animals of (5), an adsorption amount of the aromatic component of aromatic granular material is no less than 0.005% and no more than 1% with respect to the mass of the base material. In the case that the adsorption amount of the aromatic component is less than 0.005%, the scent emitted by the aromatic component is weak and the stench cannot be restrained effectively. Also, in the case that the adsorption amount is more than 1%, since a strong scent emits from the aromatic component regularly and fills a room, an animal master may feel unpleasant. More preferably, the adsorption amount is no less than 0.01% and no more than 0.1%.

(6) The animal litter for animals according to any one of (I) to (5), wherein a heat release value is no less than 40 cal, when 20 cc of physiological saline solution of 1% by mass is absorbed.

The animal litter for animals of (6) has the property of heat release value upon absorbing water. Specifically, the heat release value is no less than 40 cal when 20 cc of physiological saline solution of 1% by mass is absorbed, and the temperature rise of the animal litter in this process is from 2° C. to 15° C. More preferably, the heat release value is no less than 80 cal. In the case that the heat release value is less than 40 cal, the volatilization of the aromatic component adsorbed onto the base material cannot be promoted adequately and the stench cannot be restrained adequately. Here, "the heat release value when 20 cc of physiological saline solution of 1% by mass is absorbed" refers to the heat release value of the animal litter on absorbing the physiological saline solution when 20 cc of physiological saline solution of 1% by mass is dripped over a period of 10 seconds from a position of 20 mm height using a burette onto animal litter filled in a predetermined container. In this process, the thickness of the animal litter filled in the predetermined container must be that can adequately absorb 20 cc of physiological saline solution, and specifically, a thickness is preferably no less than 80 mm.

(7) The animal litter for animals according to any one of (1) to (6), wherein the base material is porous.

The base material used in the aromatic granular material making up the animal litter for animals of (7) is a porous material. A "porous material" refers to a substance having numerous pores and having a property of being able to adsorb molecules or ions of gases, liquids, etc. This porous material is used favorably as animal litter so as to have excellent absorption and adsorption performance. With the present invention, among such porous materials, due to selecting a porous material having a property of generating heat by absorbing water as the base material, the stench can be restrained effectively by the effect of promoting the volatilization of beforehand adsorbed aromatic component, in addition to the effect of deodorization which the porous material inherent have.

The base material may contain short fiber pulp, wood flour, starch, etc. Two-layer structure like a skin/core type may also be used, and in this case, a structure, with which heat is generated when the skin layer absorbs water, is preferable.

(8) The animal litter for animals according to any one of (1) to (7), wherein the base material is at least one material selected from the group of bentonite, acid clay, silica gel, and diatomaceous earth.

The base material used in the aromatic granular material making up the animal litter for animals of (8) is at least one type of material selected from the group of bentonite, acid clay, silica gel, and diatomaceous earth. Here, "bentonite" and "acid clay" are clays having montmorillonite as the main component and have the property of swelling and hardening by absorbing water. "Silica gel" is the coagulation of a colloidal solution of silicic acid, and due to being a porous substance and having hydroxyl groups on its surface, has the property of physically and chemically adsorbing water. "Diatomaceous earth" has silicic acid as the main component, and is from several µm to several dozen urn in diameter, has formed therein numerous pores of 0.1 µm to 10 µm that lead from the interior to the exterior, and has excellent water absorbing and adsorbing property.

(9) The animal litter for animals according to any one of (1) to (8), wherein the base material is bentonite and/or acid clay that has been treated with an alkali metal.

The base material used in the aromatic granular material making up the animal litter for animals of (9) is bentonite and/or acid clay which is modified by being treated with an alkali metal, and improved in heat release value. Specifically, an alkali metal component, such as NaOH or $Na_2CO_3$, etc., is added to bentonite and/or acid clay and modification is performed at a high temperature of 100° C. or more. By modifying bentonite, etc., by an alkali metal and thereby improving the heat release value, the volatilization of the aromatic component can be promoted further and the stench can be restrained effectively.

(10) The animal litter for animals according to any one of (1) to (9), wherein the base material is granulated by a granulator.

The base material used in the aromatic granular material making up the animal litter for animals of (10) is granulated by using a granulator. Each base materials that have been granulated by a granulator have a uniform shape and are uniform in absorption and adsorption performance. Therefore the animal litter for animals that have an effect of stable restraining against the stench can be provided.

DESCRIPTION OF THE SYMBOLS 10 aromatic granular material
20 animal litter box

DESCRIPTION OF THE PREFERRED EMBODIMENT

Preferred embodiments of the present invention will be explained with reference to the drawings.

Figure 1:
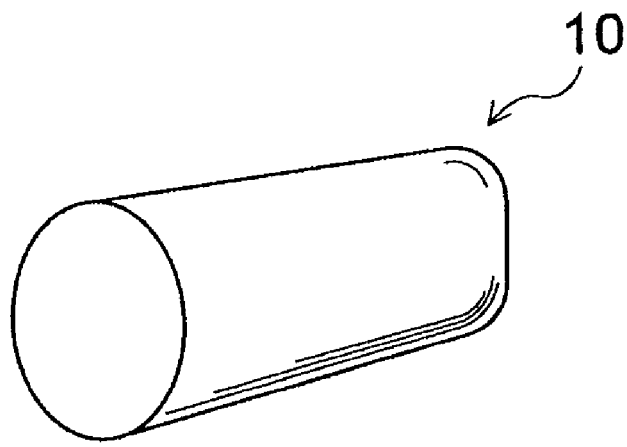
FIG. 1 is a perspective of a granular material that makes up the animal litter for animals of the present invention.
Figure 2:
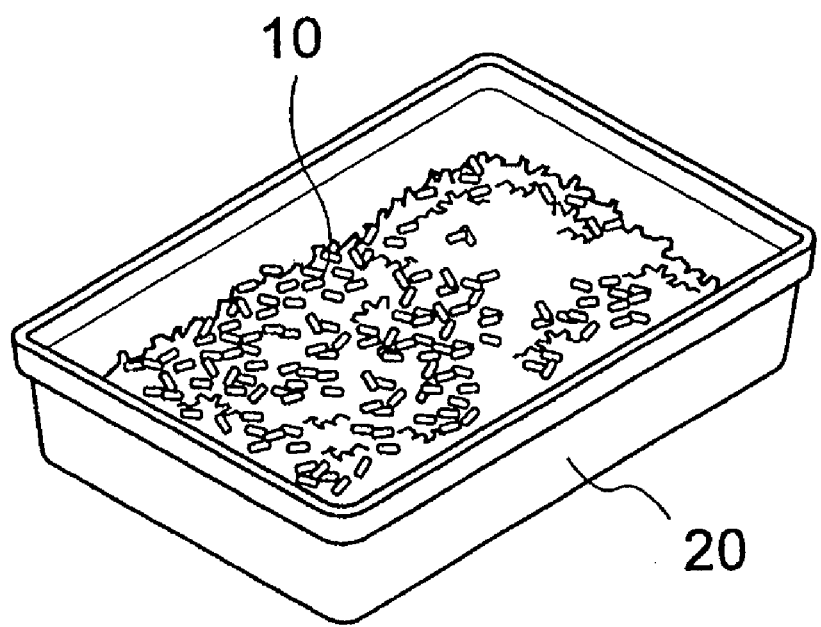
FIG. 2 is a drawing showing a state of use of the animal litter for animals of the present invention.

The form of the aromatic granular material that make up the animal litter of the present invention is not restricted in particular, and for example, aromatic granular materials 10 of approximately cylindrical form, such as shown in FIG. 1, may be used. These aromatic granular materials 10 have an approximately cylindrical form with an inner diameter of about 3 mm and a height of about from 3 mm to 8 mm. Also, as shown in FIG. 2, these aromatic granular materials 10 are put to use by being placed in an animal litter box 20, a container made of plastic.

<Production Method>

The aromatic granular materials 10 that make up the animal litter for animals of the present invention are produced by a granulation step of granulating a base material, an aromatic component adsorption step of making aromatic granular materials by adsorbing an aromatic component onto the base material obtained by granulation, and a mixing step of mixing the base materials and aromatic granular materials obtained by the above steps.

[Granulation Step]

In the granulation step, the base material used in aromatic granular materials 10 is obtained by granulating a material that generates heat by absorbing water, that is for example, bentonite, which has been treated with an alkali metal. Specifically, formed objects are obtained by kneading bentonite, etc., by adding an aqueous sodium hydroxide solution, and granulating it by using a disk pelleter, etc. The formed objects thus obtained are then dried adequately, and adjusted so as not to include coarse grains of 10 mm or more. The base material is thus obtained.

[Aromatic Component Adsorption Step]

In the aromatic component adsorption step, an aromatic component is adsorbed onto the base material obtained in the granulation step to provide the aromatic granular materials 10 that make up the animal litter for animals of the present invention. The granular materials 10, that the aromatic component is adsorbed onto the surface of the base material, can be obtained, for example, by spraying the aromatic component onto the base material obtained in the granulation step. On spraying the aromatic component, the base materials obtained in the granulation step, are placed and stirred in a pan-type granulator, and an ethanol solution in which the aromatic component is dissolved, is sprayed on the base materials, and then the aromatic granular materials 10 are obtained.

The aromatic component used in the present invention is not restricted in particular, and an alcohol-based fragrance, an aldehyde-based fragrance, a ketone-based fragrance, an ether-based fragrance, an ester-based fragrance, a hydrocarbon-based fragrance, a lactone-based fragrance, a natural fragrance, etc., can be used singly or in combined form.

[Mixing Step]

By mixing the base material obtained in the granulation step and the aromatic granular materials 10 obtained in the aromatic component adsorption step at a predetermined ratio, the animal litter for animals of the present invention can be obtained.

According to the present invention, the animal litter for animals, which are not emitting a strong scent regularly, but emit a strong scent by absorbing an animal's excrement, and thereby effectively restrain the stench emitted from the excrement, can be provided.

Example

The present invention will now be further specifically explained below by Examples and Comparative Examples, but the present invention is not limited by the following Examples.

<Production of the Base Material>

9 kg of bentonite, produced from Karita-gun, Miyagi Prefecture and having a water content of 33.3%, was kneaded by adding 1 kg of a 20% aqueous solution of sodium hydroxide. After kneading well, granulation was carried out by using a disk pelleter made by Fuji Paudal Co., Ltd. and formed objects with a cylindrical shape of 3 mm diameter were obtained. The base material was then obtained by drying the obtained cylindrical formed objects at 180° C. for 30 minutes and thereafter adjusting so as not to include coarse grains of 10 mm or more.

<Production of Animal Litter for Animals>

Using the base material obtained by granulation, the animal litter of the Examples and Comparative Examples were produced. In producing the animal litter, the adsorption amount of the aromatic component with respect to the base material was unified at 0.05% by mass with all of the Examples and Comparative Examples.

Example 1

10 kg of the base materials were placed in a pan-type granulator, and while stirring, 50 g of an ethanol solution, containing an aromatic component (a blended fragrance, containing an alcohol-based fragrance, an aldehyde-based fragrance, and a natural fragrance) at 10%, was sprayed on them, and thereby obtained aromatic granular materials having the aromatic component adsorbed near the surface. By mixing the obtained aromatic granular materials with nine times amount of the base material, animal litter for animals containing the aromatic granular materials at 10 weight % by mass was obtained.

Example 2

10 kg of the base materials were placed in a pan-type granulator, and while stirring, 50 g of the same ethanol solution as Example 1, containing the aromatic component at 10%, was sprayed on them, and thereby obtained aromatic granular materials having the aromatic component adsorbed near the surface. By mixing the obtained aromatic granular materials with four times amount of the base material, animal litter for animals containing the aromatic granular materials at 20% by mass was obtained.

Example 3

10 kg of the base materials were placed in a pan-type granulator, and while stirring, 50 g of the same ethanol solution as Example 1, containing the aromatic component at 10%, was sprayed on them, and thereby obtained aromatic granular materials having the aromatic component adsorbed near the surface. By mixing the obtained aromatic granular materials with twice amount of the base material, animal litter for animals containing the aromatic granular materials at 33% by mass was obtained.

Example 4

10 kg of the base materials were placed in a pan-type granulator, and while stirring, 50 g of the same ethanol solution as Example 1, containing the aromatic component at 10%, was sprayed on them, and thereby obtained aromatic granular materials having the aromatic component adsorbed near the surface. Using the obtained aromatic granular materials itself as Example 4, animal litter for animals containing the aromatic granular materials at 100% by mass was obtained.

Comparative Examples 1 to 4

As Comparative Examples 1 to 4, animal litter for animals were produced by adding the same aromatic component as Example 1 but using different addition methods from that of Example 1. Specifically, methods, wherein the base materials obtained by granulation were placed in a predetermined bag, and then the aromatic component is dripped into this bag, were employed. More specifically, 50 g of the base material were placed in a bag and 2.5 g of the ethanol solution containing the aromatic component at 10% were dripped onto them at three locations. The base materials were then left alone as it is to produce Comparative Example 1, while subsequent mixing was carried out to produce Comparative Example 2. Dripping at ten locations was carried out and leaving alone was carried out to produce Comparative Example 3, while subsequent mixing was carried out to produce Comparative Example 4.

EVALUATION

Examples and Comparative Examples were evaluated with regard to scent. Specifically, animal litter, before and after absorption of 20 cc of physiological saline solution of 1% by mass were stored for nine days at room temperature and in an oven at 50° C., and the scent after storage was evaluated. The evaluation was carried out using Example 4 after nine days of storage at room temperature as a reference. The evaluation results are shown in Table 1.

o: The scent is equivalent to that of Example 4 after nine days of storage at room temperature.

Δ: There is a slight bentonite smell in comparison to Example 4 after nine days of storage at room temperature.

x: The bentonite smell is strong.

As shown in Table 1, before absorption, all of the samples are equivalent in scent and a significant difference is not seen. After absorption, the scent of the aromatic component was weak and the bentonite smell was strong with Comparative Examples 1 to 4. It was thus confirmed that in cases that adsorption was carried out by dripping a liquid, containing the aromatic component, onto the base material, the effect couldn't continue. It is considered that this have been caused because the number of grains, onto which the fragrance had been adhered, have been little. It was found that among Examples 1 to 4, with which adsorption was carried out by spraying, the animal litter containing the aromatic granular materials in the range of no less than 33% by mass had a scent equivalent to that of 100% by mass of the aromatic granular materials under the room temperature storage. Meanwhile, under storage at 50° C., it was found that the animal litter containing the aromatic granular materials in the range of no less than 20% by mass had a scent equivalent to that of 100% by mass of the aromatic granular materials. It was furthermore confirmed that, even in the case that the aromatic granular materials was contained in the range of no less than 10% by mass, though there was a slight bentonite smell, the scent of the aromatic component was continued.

What is claimed is:

1. A method of manufacturing animal litter for animals, comprising:
    a granulation step of obtaining a base material by adding an alkali metal component to granules of a material which generates heat when absorbing water, followed by heating at a temperature of 100° C. or above,
    an aromatic component adsorption step of obtaining an aromatic granular material after the heating step by adsorbing an aromatic component onto a first portion of the base material so that the amount of the aromatic component absorbed is 0.005% or more and 1% or less with respect to the amount of said first portion of the base material, and
    a mixing step of mixing a second portion of the base material free of the aromatic component and the aromatic granular material.

2. A method of manufacturing animal litter for animals according to claim 1, wherein the aromatic granular materials constitute 10% or more of the granular materials by mass.

3. A method of manufacturing animal litter for animals according to claim 1, wherein the aromatic component is adsorbed near the surface of the base material.

4. A method of manufacturing animal litter for animals according to claim 1, wherein the animal litter is configured to release 40 calories or more of heat when 20 cc of 1% by mass physiological saline solution is adsorbed.

5. A method of manufacturing animal litter for animals according to claim 1, wherein the base material is porous.

TABLE 1

|  |  | Comparative Example 1 | Comparative Example 2 | Comparative Example 3 | Comparative Example 4 | Example 1 | Example 2 | Example 3 | Example 4 |
| --- | --- | --- | --- | --- | --- | --- | --- | --- | --- |
| 9 days at room temperature | Before absorption | o | o | o | o | o | o | o | o |
|  | After absorption of 20 cc | x | x | x | x | Δ | Δ | o | o |
| 9 days at 50° C. | Before absorption | o | o | o | o | o | o | o | o |
|  | After absorption of 20 cc | x | x | x | x | Δ | o | o | o |

6. A method of manufacturing animal litter for animals according to claim 1, wherein the base material is at least one material selected from the group consisting of bentonite, acid clay, silica gel, and diatomaceous earth.

7. A method of manufacturing animal litter for animals according to claim 1, wherein the base material comprises bentonite or acid clay that has been treated with an alkali metal.

8. A method of manufacturing animal litter for animals according to claim 1, wherein the base material is granulated by a granulator adjusted so as not to include coarse grains of 10 mm or more.

\* \* \* \* \*